(12) United States Patent
Chen et al.

(10) Patent No.: US 8,538,835 B2
(45) Date of Patent: Sep. 17, 2013

(54) METHODS AND APPARATUS FOR SUPPORTING ELECTRONIC REQUESTS FOR INFORMATION AND PROMOTIONS ON MULTIPLE DEVICE PLATFORMS IN AN INTEGRATED MANNER

(75) Inventors: John Anthony Chen, Ashburn, VA (US); Kenneth Gould, Reston, VA (US); Will Kreth, New York, NY (US); Vipul Patel, Upper Holland, PA (US)

(73) Assignee: Time Warner Cable Enterprises LLC, New York, NY (US)

( * ) Notice: Subject to any disclaimer, the term of this patent is extended or adjusted under 35 U.S.C. 154(b) by 250 days.

(21) Appl. No.: 12/843,596

(22) Filed: Jul. 26, 2010

(65) Prior Publication Data
US 2011/0295719 A1 Dec. 1, 2011

Related U.S. Application Data

(60) Provisional application No. 61/349,745, filed on May 28, 2010.

(51) Int. Cl.
*G06Q 30/00* (2006.01)
*G06F 17/30* (2006.01)

(52) U.S. Cl.
USPC .......................................... 705/27.1; 705/26.1

(58) Field of Classification Search
USPC ..................... 705/26.1–27.2, 14.4–14.72, 319
See application file for complete search history.

(56) References Cited

U.S. PATENT DOCUMENTS

| | | | |
|---|---|---|---|
| 7,013,286 B1* | 3/2006 | Aggarwal et al. | 705/14.26 |
| 7,343,317 B2* | 3/2008 | Jokinen et al. | 705/14.64 |
| 7,418,451 B2* | 8/2008 | Leung et al. | 1/1 |
| 7,493,269 B2* | 2/2009 | Fostick et al. | 705/14.26 |
| 7,593,862 B2* | 9/2009 | Mankoff | 705/14.1 |
| 7,769,634 B2* | 8/2010 | Leung et al. | 705/14.58 |
| 8,271,320 B2* | 9/2012 | Agrawal et al. | 705/14.22 |
| 2006/0179006 A1* | 8/2006 | Humpleman et al. | 705/64 |
| 2007/0207780 A1* | 9/2007 | McLean | 455/414.1 |
| 2008/0052169 A1* | 2/2008 | O'Shea et al. | 705/14 |
| 2008/0221999 A1* | 9/2008 | Spector | 705/14 |
| 2010/0262489 A1* | 10/2010 | Salinas | 705/14.49 |
| 2011/0134108 A1* | 6/2011 | Hertenstein | 345/419 |

OTHER PUBLICATIONS

"Digital Coupons SPeak up in the Social Media Conversation." Business Wire. Apr. 20, 2010. [recovered from ProQuest on Apr. 24, 2013].*

* cited by examiner

*Primary Examiner* — Peter Choi
*Assistant Examiner* — Kathleen G Palavecino
(74) *Attorney, Agent, or Firm* — Straub & Pokotylo; Michael P. Straub; Stephen T. Straub (57) ABSTRACT

Methods and apparatus for supporting electronic promotions and electronic requests for information, e.g., in an integrated manner, on multiple platforms including, e.g., cable network systems, cell phones, etc., are described. Rewards and/or benefits are tracked in a centralized manner and a subscriber is allowed to accumulate rewards and benefits in a single account irrespective of which device or platform was used to initiate an eRFI and/or to act upon a promotion. The methods and apparatus of the present invention allow a cable service provider which supports eRFI on set top boxes to use the same eRFI server to provide responses to eRFI requests received from devices, e.g., cell phones and/or E-mail devices corresponding to a service subscriber, to forward electronic promotion information and to reward users in a forwarding chain for redemptions of coupons included in forwarded promotion information. Forwarded promotion information securely identifies each device/user in the forwarding chain.

24 Claims, 5 Drawing Sheets

METHODS AND APPARATUS FOR SUPPORTING ELECTRONIC REQUESTS FOR INFORMATION AND PROMOTIONS ON MULTIPLE DEVICE PLATFORMS IN AN INTEGRATED MANNER

RELATED APPLICATIONS

The Present application claims the benefit of U.S. Provisional Patent Application Ser. No. 61/349,745 filed May 28, 2010 which is hereby expressly incorporated by reference in its entirety.

FIELD OF THE INVENTION

The present invention relates to methods and apparatus for supporting electronic requests for information and promotions e.g., in an integrated manner, on multiple platforms including, e.g., cable network systems, cell phones, etc.

BACKGROUND OF THE INVENTION

The concept for providing users of cable systems an opportunity to issue an electronic Request for Information (eRFI) in response to a promotional video and/or advertisements is possible using a cable network's ability to communicate with a set top box in both the downstream and upstream directions.

By initiating eRFI, a set top box user can select, e.g., opt in, to have promotional material and/or advertising information of interest to the user sent directly to the user's set top box. This allows a user to receive targeted promotions and/or discount information via their television sets. Unfortunately, delivery of such promotional material and/or targeted advertisements to the set top box limits a user's ability to access the promotional material to certain times, e.g., when they are at home. The use of the STB interface as the method by which a user communicates an eRFI request to the provider of the information and/or promotional material also limits the ability of a user to initiate an eRFI.

It would be desirable from the perspective of cable network providers as well as customers, if eRFI support and the information and/or promotion material provided in response to an eRFI could be extended to platforms other than just set top boxes. In addition to extending the reach of eRFI to multiple platforms, it would be desirable if rewards could be tracked and maintained for individual subscribers in a manner that allows a subscriber to accumulate rewards and benefits regardless of the platform the individual subscriber used to initiate the eRFI and/or act upon promotional material provided in response to an eRFI.

SUMMARY OF THE INVENTION

Methods and apparatus for supporting electronic requests for information and promotions e.g., in an integrated manner, on multiple platforms including, e.g., cable network systems, cell phones, etc., are described. Rewards and/or benefits are tracked in a centralized manner and a subscriber is allowed to accumulate rewards and benefits in a single account irrespective of which device or platform was used to initiate an eRFI and/or to act upon a promotion.

The methods and apparatus of the present invention allow a cable service provider which supports eRFI on set top boxes to use the same eRFI server to provide responses to eRFI requests received from devices, e.g., cell phones and/or E-mail devices corresponding to a service subscriber.

In some embodiments subscribers are rewarded for forwarding promotional information and/or eRFI related material to other individuals who may or may not be subscribers to the same service as the subscriber responsible for forwarding the promotional information and/or eRFI related material. The rewards may be provided when the party to whom the promotional material is sent acts on promotional material, e.g., makes a purchase in accordance with the promotion and/or provides information used to sign up for a service or results in the party to whom the information was forwarded being added, e.g., voluntarily, to a list for receiving additional promotional material.

The methods and apparatus of the present invention allow a cable service provider and/or other company which supports eRFI functionality, to leverage that functionality to reach individuals using multiple different platforms, e.g., communications devices, such as set top boxes, cell phones and/or computer systems. The methods also allow users of eRFI to receive rewards and/or benefits not only via the promotions and offers made available in response to received eRFIs but also for forwarding and/or encouraging others to participate in eRFI related promotions and advertisements and/or to sign up for services which may be of interest to other individuals.

Various additional features and advantages of the present invention are discussed in the detailed description which follows.

DETAILED DESCRIPTION

Figure 1:
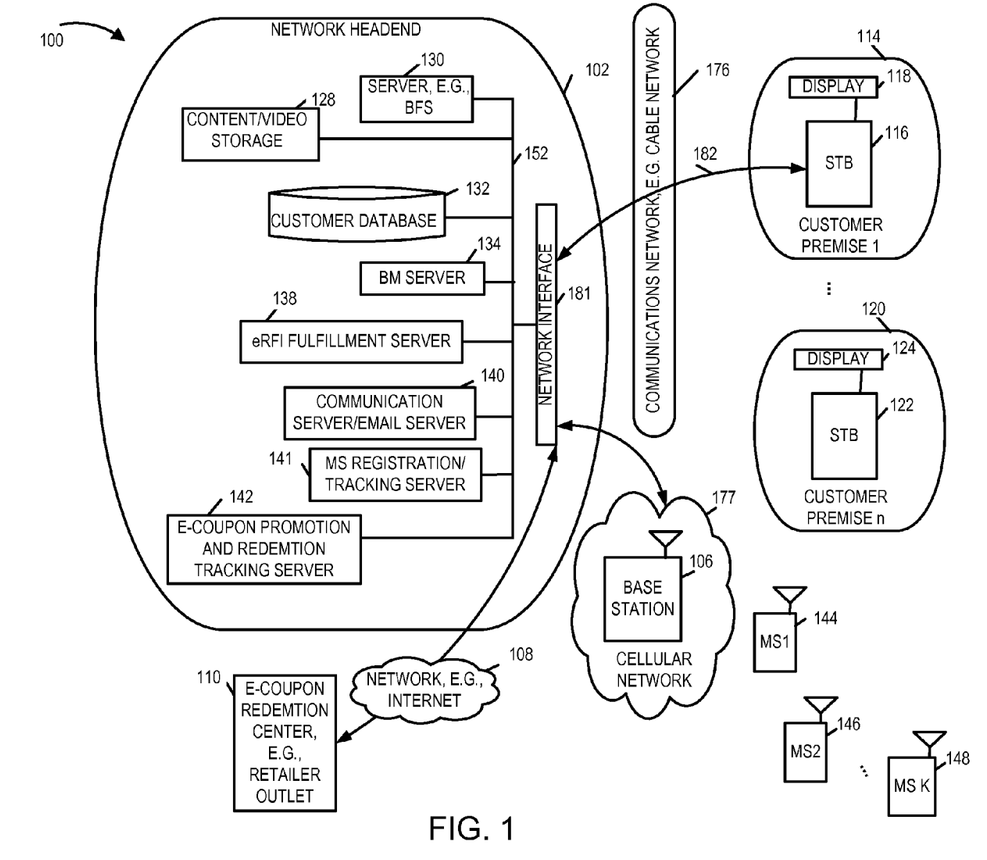
FIG. 1 illustrates a system implemented in accordance with the present invention which support eRFI, promotions and rewards on multiple platforms including set top boxes and cell phones.

FIG. 1 illustrates a system 100 implemented in accordance with one exemplary embodiment of the present invention. The system 100 shown in FIG. 1 supports electronic requests for information and promotions e.g., in an integrated manner, on multiple platforms including, e.g., cable network systems, cell phones, etc. The system 100 includes a network headend, 102, a communications network 176, e.g., a cable network, a plurality of customer premises 114, 120 in addition to a base station 106, network 108, e.g., Internet, E-coupon redemption center 110 and a plurality of mobile communications devices, e.g., cell phones 144, 146, 148. In the discussion, cell phones are also referred to as mobile stations (MS).

The network headend 102 may be implemented at a cable network office or site including multiple servers and databases which are coupled together. In the FIG. 1 example, the headend 102 includes a broadcast file server 130, content storage 128, a customer database 132, a business management server 134, an eRFI fulfillment server 138, a communication server 140, an MS registration and/or tracking server 141 and a promotion and redemption tracking server, e.g., a server 142 which supports E-coupon redemption. The various servers and other components included in the headend 102 are coupled together by a local network 152. The local network 152 is coupled via one or more network interfaces 181 to other networks and/or devices. For example, the headend 102 is coupled via network interface 181 to communications network 176, e.g., a cable network, and is also coupled to cellular network 177 and to the Internet 108. The cellular network 177 includes one or more base stations 106 for transmitting to and/or receiving signals from cell phones and/or other mobile devices 144, 146, 148.

Via cable network 176, the devices in the network headend 102 can send video content, promotional information and/or other information to set top boxes and/or computers located at the customer premises 114, 120 coupled to the cable network. Each customer premise 114, 120 includes a set top box 116, 122 and a display device 118, 124. The STBs may support video and, optionally, E-mail functionality. The STBs 116, 122 can be used to send information, e.g., an eRFI request, to the network headend in addition to receiving content, E-mails and promotional information from the headend 102. One or more customer premises may also include computers capable of receiving and displaying video content in addition to E-mails and providing information including eRFI to the network headend 102.

As will be discussed below, the eRFI fulfillment server 138 is not only capable of responding to eRFI requests received from STBs but also ones received from mobile devices 144, 146, 148. This is made possible via base station 106. Such responses may include transmission or forwarding of one or more electronic coupon which can be redeemed at a retailer outlet or other location such as E-coupon redemption center 110. The E-coupon may include a number which can be entered at the retailer outlet as part of the redemption process or a bar code which can be displayed on the screen of the mobile device 144, 146 or 148 and scanned at the redemption center 110. The E-coupon promotion and redemption tracking server 142 keeps track of E-coupons which are issued and/or forwarded as well as their redemption. Users who forward E-coupons, E-mails or other information which results in the redemption of an E-coupon by another person receives a credit or other reward which they can use to obtain a discount or reduce a service charge. In various embodiments the E-coupon promotion and redemption tracking server 142 also keeps track of the number of eRFI enabled video advertisements and/or other promotional material viewed by a user on his/her mobile handset. In some embodiments such advertisement viewing activity of the user is reported by the user mobile handset to the tracking server 142. Customer database 132 may be updated by the E-coupon promotion and redemption tracking server 142 to reflect credits and/or service discounts to which an existing customer, e.g., cable service subscriber is entitled as a result of E-coupon or other promotional redemptions by others, e.g., individuals to which an E-coupon or promotion information was forwarded or directed in a verifiable way from the customer being provided the reward.

Figure 2:
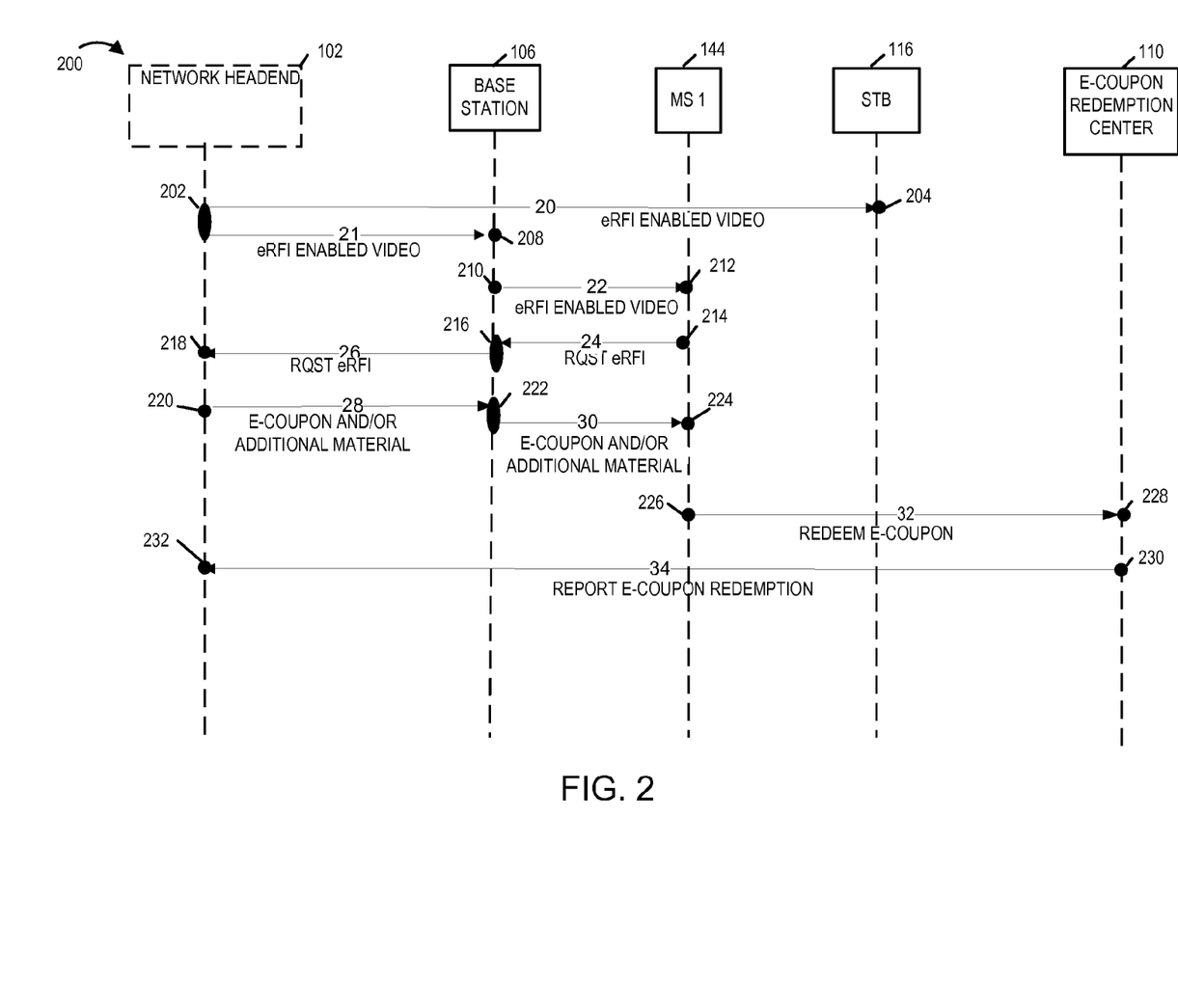
FIG. 2 illustrates signaling performed in accordance with one exemplary embodiment implemented using the system shown in FIG. 1.

Having generally discussed the exemplary system shown in FIG. 1, an exemplary method will now be discussed in detail with regard to the example shown in FIG. 2. Elements of the system 100 shown in FIG. 1 which participate in the method being explained in the FIG. 2 example are shown at the top of FIG. 2 and bear the same reference numbers as used in FIG. 1. Messages, signals, information and/or content communicated between devices are represented in FIG. 2 using arrows. The exemplary process shown in FIG. 2 will now be described in detail.

Various figures used to describe the exemplary embodiments of the present invention will now be discussed. At the top of FIGS. 2 and 3, various elements 200 of the system 100 which may participate in an electronic promotion campaign in accordance with one embodiment of the invention, are shown. The illustrated components 200 include network head end 102, base station 106, a user mobile station MS 144, user STB 116, and the coupon redemption center 110, e.g., a retailer outlet where a user can redeem an E-coupon.

FIG. 2, illustrates the steps and associated signaling used in one exemplary embodiment where a customer receives electronic promotion information, e.g., an eRFI enabled video, on his mobile communications device MS 144, as part of the advertisement/promotional campaign and redeems the associated E-coupon at a coupon redemption center 110. In some embodiments the electronic promotion information is, e.g., an eRFI enabled promotional video, e.g., an interactive advertisement commercial video stream including information regarding some promotional marketing offer from an advertiser/promoter. In some embodiments the eRFI enabled promotional video can also be sent independently to the customer STB device 116 located at customer premise, e.g., customer home. In this example, MS 144 belongs to the same customer to whom the STB device 116 belongs. The process starts in step 202 where promotional information, e.g., an eRFI enabled video, is sent from the headend 102 to the customer STB 116, and to the user mobile station MS 144 via the base station 106. In some embodiments the promotional eRFI enabled video is sent to the STB 116 first prior to being sent to the MS 144. In some such embodiments, the user settings at the STB 116 direct the headend 102 to send one or more promotional videos and/or E-coupons, e.g., which relate to some user defined criteria, to the MS 144. In some embodiments the customer may customize the settings of the STB 116 so that the promotional eRFI enabled videos are sent to the MS 144 only when the user is not available at the customer premise 114 to view and respond to such promotional eRFI enabled videos. However in still some other embodiments the promotional eRFI enabled videos may be sent to both the STB 116 and the MS 144 simultaneously.

In the example discussed in FIG. 2, the promotional eRFI enabled video is sent from the headend 102 in step 202 to the STB 116, e.g., over the communications network 176, and to the base station 106. In some embodiments the communications/E-mail server 140 in headend 102 is configured to send the eRFI enabled video stream to the base station 106 (arrow 21), while the BFS 130 may be responsible for broadcasting the eRFI enabled video (arrow 20) to one or more customer STB devices including the STB 116. The STB 116 receives the promotional eRFI enabled video in step 204, and in this example we assume that no user response is detected at the STB 116 in response to the promotional eRFI enabled video. The base station 106 receives the promotional eRFI enabled video from the headend 102 in step 208. In step 210 the base station forwards the promotional eRFI enabled video to the customer MS 144. The MS 144 receives the promotional eRFI enabled video in step 212. In some embodiments the received eRFI enabled video is a part of a larger video stream. Upon receipt, the MS 144 displays the eRFI enabled video and presents an invitation, e.g., a prompt on the display, to take an action, and monitors for a user response.

When the user of MS 144 is interested in the promotional information being presented in the promotional eRFI enabled video, the user responds to the displayed prompt by sending an eRFI request to the headend. Thus in step 214, an eRFI request is generated and sent to the headend 102, via the base station 106. In step 216 the base station 106 receives a message including the eRFI request from the MS 144 and sends the eRFI request to the headend 102. The headend receives the eRFI request from the base station 106 in step 218 and process the received eRFI request. In various embodiments the eRFI request is processed by the eRFI fulfillment server 138 in the headend 102. In some embodiments the fulfillment, in the form of an electronic coupon (E-coupon) and/or additional video stream or some other promotional offer material is sent in step 220 to the base station 106, to be sent to the MS 144. In various embodiments the E-coupon and/or additional promotional material is sent to a preferred e-mail address of the customer/user of MS 144. In some embodiments the communications/E-mail server 140 sends the E-coupon directly to the preferred email address of the user of MS 144 (not shown in FIG. 2). In various embodiments the user of MS 144 is able to access internet and e-mails using the MS 144 which supports web browsing functionality. In step 222 the base station 106 receives the E-coupon and/or additional promotional material and sends it in a message to the MS 144

The MS 144 receives and processes the received message to retrieve the E-coupon and/or additional promotional material in step 224. In step 226 the MS 144 redeems the E-coupon, e.g., at the redemption center 110 such as a retailer outlet. In some embodiments the arrow 32 may represent submission of the E-coupon by the user of MS 144 at the redemption center 110. In some other embodiments the arrow 32 may represent utilization of the E-coupon by the user online, e.g., over the internet, for buying an item for which the E-coupon can be used, using online shopping website of the advertiser/promoter which is distributing the E-coupons.

In step 228 the redemption center 110 receives the E-coupon. In some embodiments receiving the E-coupon at the redemption center 110 includes scanning the E-coupon (e.g., a barcode on the E-coupon), e.g., using an optical scanner. Scanning the E-coupon barcode sometimes automatically marks the particular E-coupon as being redeemed or used. In some embodiments receiving the E-coupon at the redemption center 110 includes receiving a coupon code corresponding to the E-coupon, at the redemption center, e.g., when sometimes the E-coupon is used for online purchase. Following the redemption of the E-coupon by the user of MS 144, in step 230 the redemption center 110 sends a message (arrow 34) to the headend 102 reporting the redemption of the E-coupon. In some embodiments the redemption center 110 includes in the reporting message (arrow 34) some identification information corresponding to the MS 144 and/or the user of MS 144.

Figure 3:
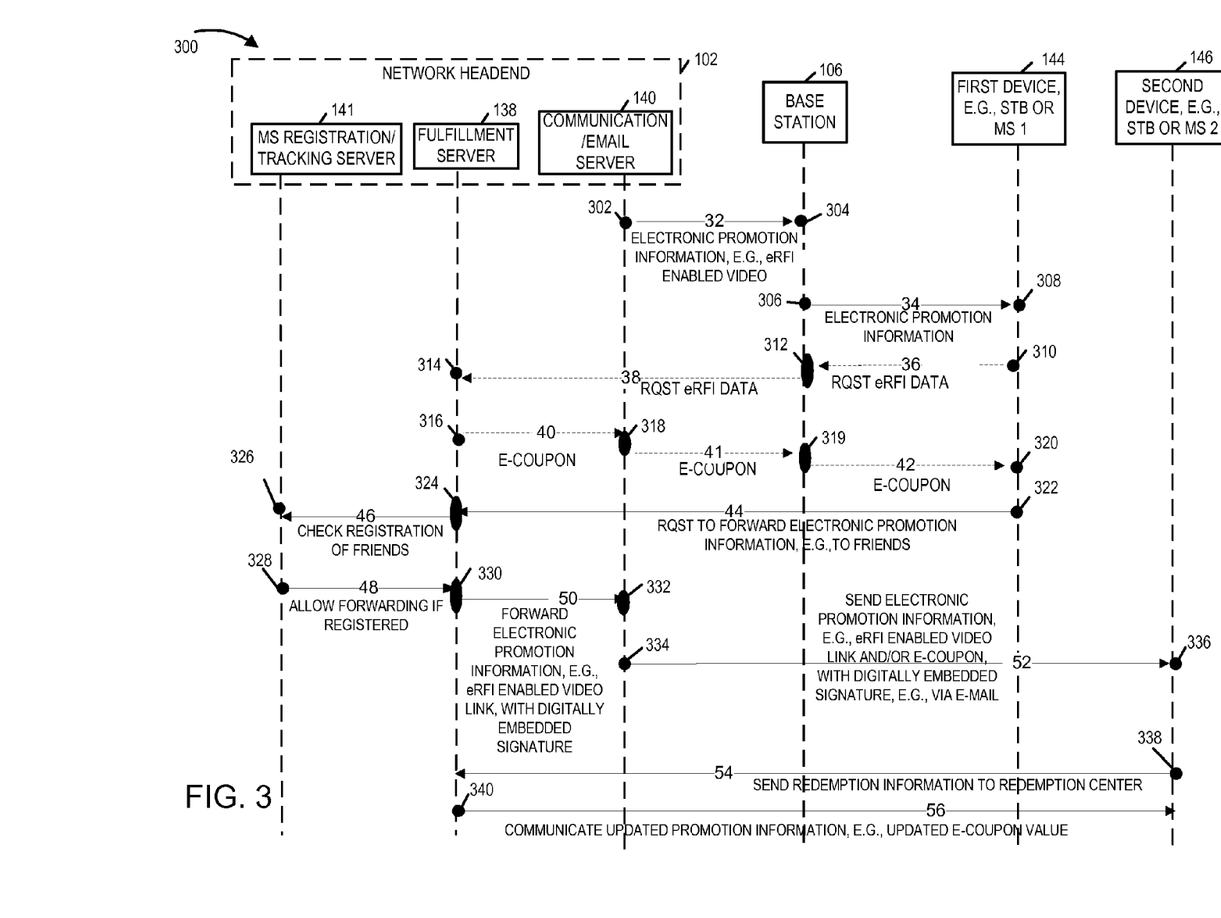
FIG. 3 illustrates signaling performed in accordance with another exemplary embodiment implemented using the system shown in FIG. 1.

FIG. 3 illustrates the steps and associated signaling used in another exemplary embodiment where a customer receives electronic promotion information, e.g., an eRFI enabled video or E-coupon, on his communications device, e.g., STB or mobile communications device MS 144, as part of the advertisement/promotional campaign and forwards the electronic promotional information to one or more friends or members of a social networking group. At the top of FIG. 3, various elements 300 of the system 100 which may participate in an electronic promotion campaign in accordance with one embodiment of the invention, are shown. The illustrated elements 300 include some of the elements shown in FIG. 2 as well. The system elements shown in FIG. 3 include network headend 102, base station 106, a user mobile station MS 144, and a second communications device, e.g., another STB or mobile station as MS 146. The second communications device (STB or MS 2 146) may belong to, e.g., a friend or a person known to the user of the first communications device, e.g., STB or MS 144. Some of the elements, which may be a part of the network headend 102 in some embodiments, are also shown in the FIG. 3 example. The additional elements include the communications/E-mail server 140, the eRFI fulfillment server 138, and the MS registration and tracking server 141. In some embodiments these additional elements may not be a part of network headend 102 but are rather distributed and operate individually in the system 100. The additional elements have been shown to present a more detailed illustration and to explain the signaling exchange between various servers in greater detail. For the purpose discussion of FIG. 3 example, we will consider the first communications device to be MS 1 144 and the second device to be MS 2 144, however it should be appreciated that the first and second communications devices could be STBs as well or one of the devices could be a STB and another a mobile device, e.g., cell phone.

The process starts in step 302 where electronic promotion information, e.g., an eRFI enabled video, is sent from the communications/E-mail server 140 (as shown using arrow 32) to the base station 106. The base station 106 receives the electronic promotion information from the communications server 140 in step 304. In step 306 the base station 106 forwards the electronic promotion information, e.g., including eRFI enabled video (arrow 34) to the customer MS 144. The MS 144 receives the electronic promotion information in step 308. In some embodiments the received eRFI enabled video is a part of a larger video stream. Upon receipt, the MS 144 displays the electronic promotion information, e.g., the eRFI enabled video, and presents an invitation, e.g., a prompt on the display, for the user to take an action, and monitors for a user response.

When the user of MS 144 is interested in the promotional information being presented in the promotional eRFI enabled video, the user responds to the displayed prompt by sending an eRFI request to the headend 102. In step 310, an eRFI request which is a request for eRFI promotional material/additional information, is generated and sent to the headend 102, via the base station 106. In step 312 the base station 106 receives a message including the eRFI request from the MS 144 and sends the eRFI request to the eRFI fulfillment server 138 in the headend 102. The eRFI fulfillment server 138 receives the eRFI request in step 314 and processes the received eRFI request. In step 316 the eRFI fulfillment server 138 communicates an E-coupon corresponding to the eRFI request from the MS 144 and/or additional video stream or some other electronic promotional offer material to the communications/E-mail server 140. In step 318 the communications/E-mail server 140 sends the E-coupon to the base station 106, to be sent to the MS 144. The base station 106 receives the E-coupon and/or additional promotional material in step 319 and sends (as shown using arrow 42) the E-coupon in a message to the MS 144. In various embodiments the E-coupon and/or additional promotional material is sent to a preferred e-mail address of the customer/user of MS 144. In various embodiments the user of MS 144 is able to access internet and e-mails using the MS 144 which supports web browsing functionality. The MS 144 receives and processes the received message to retrieve the E-coupon and/or additional promotional material in step 320.

It should be noted that the signaling exchange related to the MS 144 user requesting eRFI (e.g., arrows 36, 38) and the fulfillment server 138 sending the E-coupon in return (arrows 40, 41, 42) is shown using dashed arrows. The dashed arrows represents that this signaling exchange is optional and thus the signaling and associated steps may be performed in some embodiments, e.g., when user of MS 144 is interested in the promotional offer. In some other embodiments although the user of MS 144 may not be interested in the specific promotional offer presented in the eRFI enabled video being displayed, it is possible that MS 144 user may be aware of a friend who is generally interested in that particular promotional offer. For example, the electronic promotion information presents a promotional offer regarding a new mobile phone being offered at a heavily discounted price as part of the promotion, and the MS 144 user is aware that a friend, e.g., MS 146 user, is always on look out for new cellular phones. Thus the MS 144 user may want to forward the electronic promotion to the MS 146 user. However in some embodiments before forwarding the electronic promotion information, e.g., the eRFI enabled promotional video, to one or more friends, the MS 144 user may need permission for doing so from the service provider network headend 102. This is due to the fact that promotional offer may be intended only for the registered customers who have subscribed for such eRFI promotional offers from the advertiser.

In step 322 the MS 144 sends a request (arrow 44) to forward the electronic promotion information, e.g., promotional eRFI enabled video, e.g., to one or more friends including user of the second communications device MS 146. The request in some embodiments is sent along with some identification information, e.g., mobile phone number, e-mail address, or an identifier corresponding to the friends to whom the electronic promotion information will be sent. In step 324 the request is received (via the base station 106) at the eRFI fulfillment server 138. The eRFI fulfillment server 138, using the identification information corresponding to the user of the second device MS 146 (and other friends) indicated in the forwarding request, checks with the MS registration and tracking server 141 (arrow 46), to verify if the MS 146 user and other friends are registered or not. In step 326, the MS registration and tracking server 141 verifies if there is an entry in an eRFI registry corresponding to the one or more friends indicated in the forwarding request from MS 144. In some embodiments when it is validated that MS 146 user and other friends are registered, the registration/tracking server 141 in step 328 signals the fulfillment server 138 to allow forwarding of the electronic promotion information. In step 330 the fulfillment server 138 receives the allow forwarding signal 48 from the registration/tracking server 141. Further in accordance with the invention, in step 330 the fulfillment server 138 digitally embeds a unique signature corresponding to the MS 144 user, in the electronic promotion information, e.g., including a eRFI promotional video link, and sends the digital signature embedded electronic promotion information (arrow 50) to the communications/E-mail server 140 for forwarding to one or more friends of MS 144 user as requested. The communications/E-mail server 140 receives the digital signature embedded electronic promotion information including, e.g., eRFI video link or E-coupon, in step 332. In step 334 the communications/E-mail server 140 sends the digital signature embedded electronic promotion information to MS 146, and optionally to the other friends as requested. In step 336 the second device user, e.g., MS 146 user, receives the electronic promotion information, e.g., the eRFI enabled video link or E-coupon, and is able to view the eRFI enabled commercial. The digitally embedded unique signature, assigned by the fulfillment server 138, identifies the MS 144 who is forwarding the video link, and makes tracking of the forwarded eRFI video links back to the originating source (such as MS 144 in this example) convenient. Further, in accordance with the invention there may be an incentive or reward for the forwarding user (e.g., MS 144) for each of the E-coupons redeemed by a friend who receive the forwarded eRFI enabled video link from MS 144.

In the FIG. 3 example it is shown that the second device MS 146 user redeems the E-coupon associated with the electronic promotion information forwarded in step 334, e.g., at a redemption center. In step 338 redemption information regarding redemption of the E-coupon associated with the forwarded electronic promotion information, is sent to the headend 102. The redemption information may be sent directly by a redemption center where the E-coupon is redeemed, such as the redemption center 110, or sometimes via the second device MS 146. In step 340 the fulfillment server 138 communicates (e.g., via communications server 140) updated promotion information, e.g., updated E-coupon value, to the first communications device MS 144, the updated E-coupon value indicating a current value of the E-coupon for the first communications device user.

In some embodiments, depending on the criteria or conditions set forth by an advertiser/promoter and the service provider headend 102, unregistered users may also be allowed to view the electronic promotion information and avail the promotional offer provided the unregistered users agree to register first. In some embodiments the registration for receiving such electronic promotion information, e.g., eRFI enabled videos, may be provided without any fee or charges, and does not necessarily bind the new users to pay for and/or subscribe to any paid service from the service provider. Thus in some such embodiments, when a registration check fails for, e.g., a friend to whom the user of MS 144 wishes to forward the electronic promotion information, a registration invitation e-mail is sent from the communications/E-mail server 140 to the friend at his/her preferred e-mail address. In some embodiments the registration invitation is sent to one or more of unregistered friends on behalf of the forwarding user (MS 144 user) who requested forwarding of the electronic promotion information. When the registration is completed by the friend, a digital signature embedded eRFI video link is sent at the preferred e-mail address of the friend by the communications/E-mail server 140.

In some embodiments the MS 144 user requests the advertiser/promoter for permission to share the electronic promotion information, e.g., eRFI enabled videos, on social networks so that a greater number of friends and/or known people, can take advantage of the offer being promoted in the electronic promotion information. In some such embodiments the advertiser offers better incentives or rewards to customers who forward and/or share the electronic promotion information, e.g., eRFI enabled video links, on social network in order to encourage the customers to spread the electronic promotion information and make the advertiser's promotion more effective. The customer on top of the social network chain, e.g., the customer who forwarded or shared the maximum number of video links which resulted in E-coupons been redeemed by other customers, may and sometimes does get the maximum reward. For example, for each additional electronic promotion information forwarded by the MS 144 user, and its associated E-coupon redeemed by a follower (i.e., a receiving user), the value of the E-coupon for MS 144 user increases, e.g., by 1%. An advantage of such an approach is that the advertisers/promoters are able to directly trace the effectiveness of their promotion campaign in the form of out-of-band eRFI video view rate, E-coupon redemption rate and/or social adoption rate.

Figure 4:
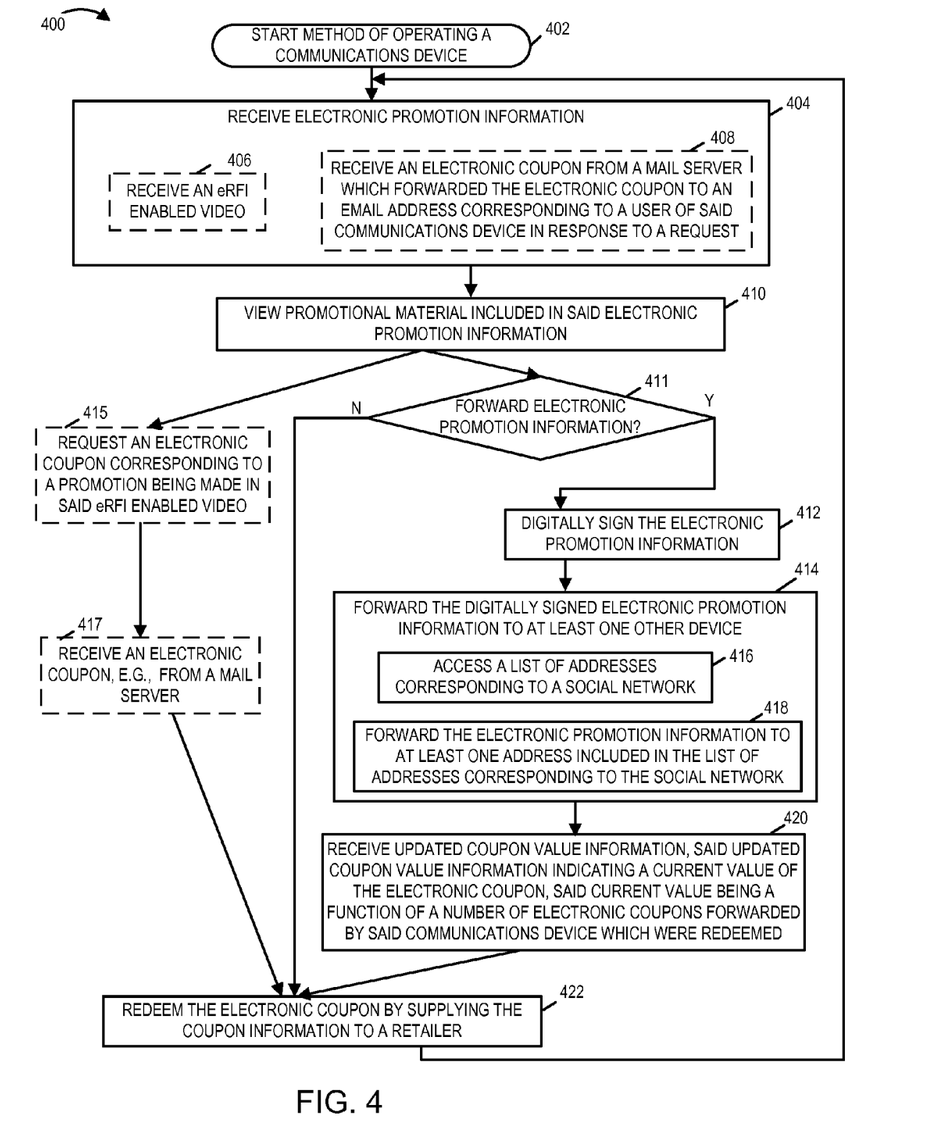
FIG. 4 is a flowchart of an exemplary method of operating a communications device to participate in an electronic promotion, in accordance with an exemplary embodiment.

FIG. 4 is a flowchart 400 of an exemplary method of operating a communications device to participate in an electronic promotion, in accordance with an exemplary embodiment. The communications device implementing the method of flowchart 400 is, e.g., set top box device or any one of the wireless terminals (mobile stations) shown in the communications system 100 of FIG. 1. For the purpose of discussion of the steps shown in the exemplary method of flowchart 400 we assume that the communications device implementing the method is MS 1 144. Operation starts in step 402, where the communications device is powered on and initialized. Operation proceeds from start step 402 to step 404.

In step 404 the communications device, e.g., MS 144, receives electronic promotion information. In various embodiments the electronic promotion information is one of a eRFI enabled video and an electronic coupon (E-coupon). Thus in some embodiments step 404 of receiving electronic promotion information includes one of steps 406 and 408. In embodiments where step 406 is performed, MS 144 receives an eRFI enabled video, e.g., interactive promotional video. In some embodiments where step 408 is performed, the MS 144 receives an E-coupon from a mail server, e.g., E-mail server 140, which forwarded the E-coupon to an e-mail address corresponding to a user of the communications device MS 144 in response to a request from the user. In some embodiments the request is sent from a set top box (STB 116) device corresponding to the user of MS 144. This may occur in some embodiments where the user views an eRFI enabled video at home (customer premise 114) on the television and sends the request for the E-coupon corresponding to the viewed promotional eRFI enabled video, from the STB 116. In some other embodiments the request may be sent from the MS 144 after viewing received electronic promotion information.

Operation proceeds from step 404 to step 410. In step 410 the user of MS 144 views the promotional material included in the electronic promotion information. For example, if the electronic promotion information is received as an eRFI enabled video then user of MS 144 views the promotional video on the MS 144 display. If the electronic promotion information is received as the E-coupon delivered on the user's preferred e-mail, the user views the E-coupon by accessing e-mail from the MS 144. In some embodiments the operation proceeds from step 410 to step 411.

In some embodiments when the received electronic promotion information is received as an eRFI enabled video, the operation proceeds from step 410 to step 415. The dashed box indicates that step 415 is optional and is performed in some embodiments while not in others. Upon receiving an eRFI enabled video and viewing the included promotional content the user of MS 144 is prompted to take an action, e.g., if the user is interested in the promotional offer. In step 415, the user of MS 144 responds to such a prompt by sending a request for an electronic coupon corresponding to the promotion being made in the eRFI enabled video. In various embodiments the request is sent to the headend 102 and is processed by the eRFI fulfillment server 138. The operation proceeds from step 415 to step 417 wherein the MS 144 receives an E-coupon, e.g., an E-coupon assigned by the eRFI fulfillment server 138 in response to the request from the MS 144 user. In various embodiments the E-coupon is sent from the communications/E-mail server 140, at the user's preferred e-mail address. Operation proceeds from step 417 to step 422.

Returning to step 411. Step 411 is a decision step wherein the MS 144 decides, e.g., based on user's choice, whether or not to forward the electronic promotion information, e.g., to a friend who might be interested in the promotional offer. If it is decided to forward the electronic promotion information, the operation proceeds from step 411 to step 412, otherwise the operation proceeds from step 411 to step 422. In step 412 the MS 144 digitally signs the electronic promotion information, e.g., by adding unique digital signatures to the electronic promotion information. In some embodiments the received electronic promotion offer (received in step 404) includes a first digital signature corresponding to a sender who forwarded the electronic promotion information to the communications device MS 144. Thus in some embodiments the received electronic promotion information may already include a first digital signature corresponding to a sender, and the MS 144 user includes a second digital signature in the electronic promotion information by said digital signing performed in step 412.

Operation proceeds from step 412 to step 414. In step 414 the digitally signed electronic promotion information is forwarded to at least one other communications device, e.g., another wireless terminal such as MS 146. In some embodiments the digitally signed electronic promotion information is forwarded to a plurality of other devices. In some embodiments performing step 414 includes performing steps 416 and 418. In step 416 the MS 144 user accesses a list of addresses corresponding to a social network, e.g., a social networking group to which the MS 144 user is a member. In step 418 the electronic promotion information is forwarded to at least one address included in the list of addresses corresponding to the social network. In some embodiments forwarding the electronic promotion information includes sending a request for forwarding the electronic promotion information to a server, e.g., eRFI fulfillment server 138. In some such embodiments the server 138 receiving the request for forwarding, forwards the electronic promotion information with a signature corresponding to the first communications device from which the request for forwarding was received. In some embodiments the signature is generated by one of communications device (e.g., MS 144) and the server using a key or secret corresponding to the communications device. In some embodiments the forwarded electronic promotion information includes information identifying multiple mobile wireless communications devices which are in a forwarding chain involved in forwarding said electronic promotion information. In some embodiments forwarding the digitally signed electronic promotion information includes signing said electronic promotion information and sending said signed electronic promotion information to a second wireless communications device, e.g., MS 146.

Operation proceeds from step 414 to step 420. In step 420 the MS 144 receives updated coupon value information, said updated coupon value information indicating a current value of the E-coupon, said current value being a function of a number of E-coupons forwarded by the communications device MS 144 which were redeemed. Thus in some embodiments for each forwarded E-coupon which is redeemed by a receiving device user, the sending user (such as MS 144 user) is rewarded by the advertiser/promoter of the electronic promotion information. In some embodiments the reward or incentive is in the form of an increase in the value of the E-coupon for the MS 144 user, and the increase is indicated by the received updated coupon value information. In some embodiments when a promotional eRFI enabled video link is forwarded to one or more other devices, the sender is rewarded when the E-coupon for the promotional offer presented in the eRFI enabled video, is redeemed. The operation proceeds from step 420 to step 422.

Now returning to step 422. In step 422 the E-coupon is redeemed, e.g., by supplying the E-coupon at a coupon redemption center, e.g., a retailer outlet. In some embodiments the E-coupon can be redeemed by providing coupon information such as a number or barcode associated with the E-coupon to a retailer, and without being physically present at the retailer outlet, e.g., when buying online Operation proceeds from step 422 back to step 404.

Figure 5:
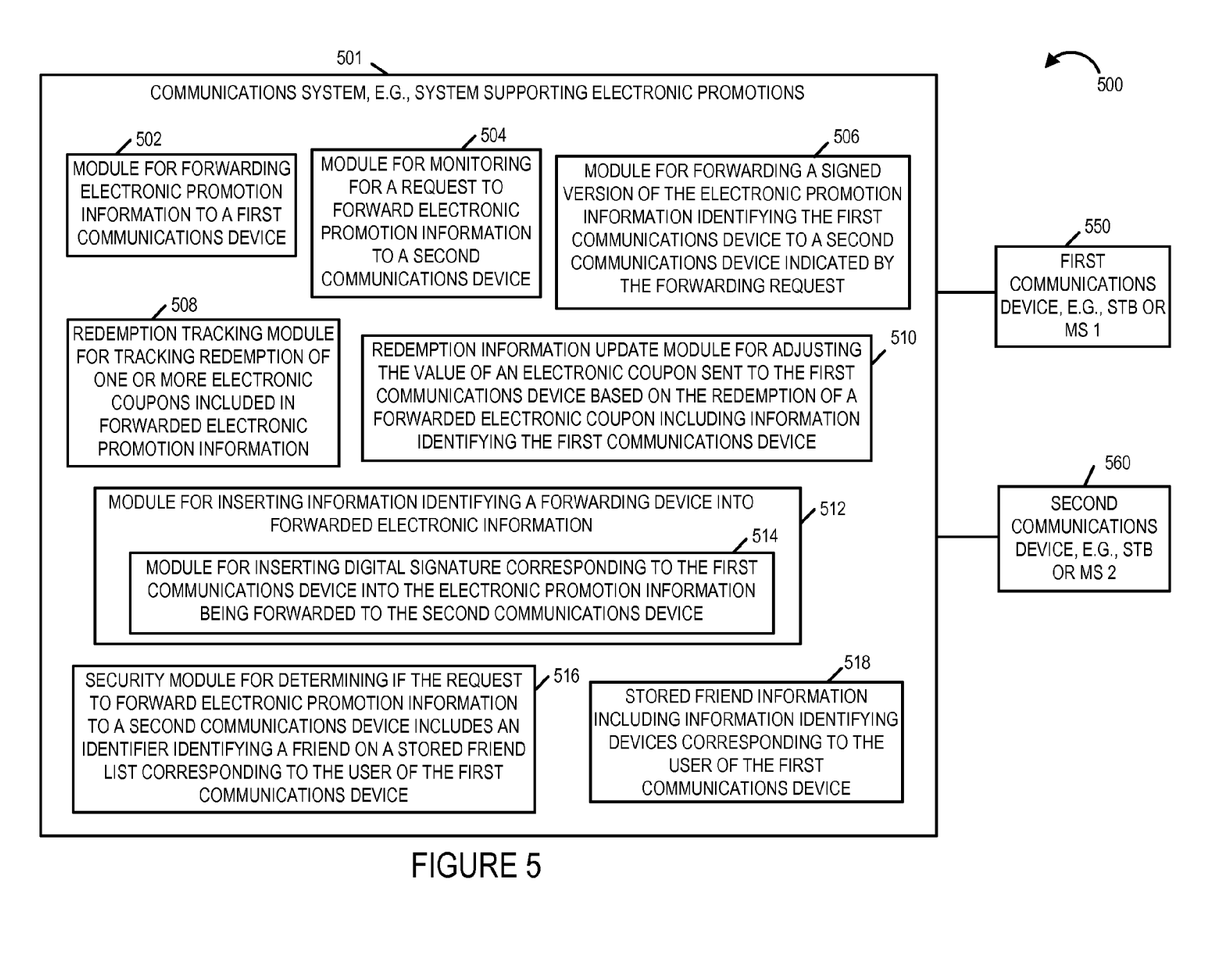
FIG. 5 illustrates an exemplary system implemented in accordance with one embodiment of the present invention.

FIG. 5 is a drawing 500 illustrating an exemplary communications system 501, coupled to exemplary first and second communications devices 550, 560, in accordance with an exemplary embodiment. The coupling to the first and second communications devices 550, 560 may be by wireless communications links, cable links, and/or other types of communications links. The exemplary communications system 501 is, e.g., a communications system for supporting electronic promotions, and includes an assembly of modules used to control the exemplary communications system 501, e.g., such as the assembly of modules shown in FIG. 5. The modules may be implemented using one or more servers and/or other hardware. The server may include a processor which is configured by a software module corresponding to the module listed in FIG. 5 to perform the function of the module listed in FIG. 5. The modules shown in FIG. 5 are non-transitory. In some embodiments the modules are implemented in hardware and/or using hardware, e.g., a processor and memory. As shown communications system 501 includes a module 502 for forwarding electronic promotion information to a first communications device 550, a module 504 for monitoring for a request to forward electronic promotion information to a second communications device 560; and a module 506 for forwarding a signed version of said electronic promotion information including information identifying said first communications device to a second communications device indicated by said forwarding request. These modules perform the corresponding steps described with respect to various operations which are performed in FIG. 3 and/or FIG. 4.

Communications system 501 further includes a redemption tracking module 508 for tracking redemption of one or more electronic coupons included in forwarded electronic promotion information; and a redemption information updating module 510 for adjusting the value of an electronic coupon sent to a communications device based on the redemption of a forwarded coupon including information identifying the first communications device. In various embodiments the communications system 501 includes stored friend information 518 including information identifying devices corresponding to the user of the first communications device 550. In some embodiments the request to forward electronic promotion information includes a friend identifier. This identifier can be, and is used in some embodiments, to identify the device to which the electronic promotion information is to be forwarded. The identifier is compared to stored information corresponding to the user device from which the request to forwarded is received and device information associated with the identifier is determined and selected for use in the forwarding operation.

The communications system 501 further includes a module 512 for inserting information identifying a forwarding device into forwarded electronic information, and a security module 516 for determining if the request to forward electronic promotion information to a second communications device includes an identifier identifying a friend on a stored friend list corresponding to the user of the first communications device The security module 516 may, and in some embodiments does, discard requests to forward which correspond to a person or identifier not included on a user's friend list. In some embodiments the module 512 further includes a module 514 for inserting a digital signature corresponding to the first communications device 550 into the electronic promotion information being forwarded. In this manner, the forwarded information will include information about the device or devices which were in the forwarding chain. This information can be used to provide rewards in response to redemption activities. In some embodiments the first communications device 550 is one of a set top box and a cell phone corresponding to the first user. The second communications device 560 may be a cell phone or set top box corresponding to a friend of the first user. Thus a user can forward electronic promotion information from his/her set top box to a set top box or cell phone of a friend who, in turn, may forward the electronic promotion information on to another friend. As discussed above, with each forwarding information identifying the forwarding party or device is embedded into the electronic promotion information allowing users in the forwarding chain to obtain rewards in response to the redemption of the forwarded electronic promotion/coupon.

Various embodiments above discuss the concept of electronic Request For Information (eRFI) and eRFI coupon application of providing opt-in, consumer requested marketing materials directly to the consumers' mobile handsets that can be delivered promptly, e.g., in seconds, after request to a mobile handset that can be traced in a social network. One of the reasons for creating an eRFI coupon application is to encourage advertisers and promoters to use this new marketing vehicle, i.e., eRFI enabled promotional videos and eRFI coupons, and to overcome advertising problems with other forms of advertisements. Various traditional static medium such as e-mail/HTML, or MMS based images with embedded 2D barcode technology, in many cases, are not visually attractive to today's consumers who are used to getting their information in a matter of second spurts lasting one or more seconds on their handsets. Modern day consumers are likely to lose interest if not entertained.

Some embodiments of the invention are directed to methods and apparatus for making the electronic coupon (e-coupon) an interactive medium where advertisers and promoters send interactive payloads in the e-coupon as virtual promotional items, in place of physical items which may enlarge their products physical packaging and/or take weeks for fulfillment. In some embodiments such interactive payload could be in the form of, e.g., 3D models and assets, showing the product that can be displayed using the eRFI coupon application in a realistic, and efficient manner. In some embodiments the consumers are allowed to virtually manipulate the product in accordance with the advertiser/promoter constraints. The advertising payload may, and in some embodiments is, encapsulated in a 3D a game environment, with the 3D game including the advertisement being sent to a potential customer's cell phone. It should be appreciated that such interactive e-coupons promote an advertiser's product in a "fun" and "exciting" manner and various rules can be, and in some embodiments are built into the e-coupon to allow redemption of the e-coupon after certain activities are achieved, but not before. In various embodiments such rules are not limited to just the virtual environment. Activities may include real world activities such as for example "treasure hunts", a purchase of one or more physical products with the completion of the activity allowing the user to "unlock" additional levels, or "power-up" items. In some embodiments, for the mobile handsets having location detection capabilities, additional interactive capabilities could be enabled, such as finding the nearest brick & mortar real location where the product is sold and where the e-coupon is accepted. Thus in some embodiments when an e-coupon is sent to a consumer mobile device, additional information regarding nearby redemption centers or retailer outlets is also sent based on the current location of the consumer. The consumer mobile device, e.g., MS 144, may and in some embodiments does, exchange signaling, e.g., to report the device's location, to the headend 102 or a server sending the e-coupon. Based on the reported current location, additional information regarding nearby redemption centers or outlets where product is sold, is sent to the consumer mobile device.

In some embodiments places where customers can redeem their e-coupons in addition to retail and/or e-tail locations, are, e.g., local schools, (e.g.: box-top, receipts for school promotional drives, etc.), and/or other community base, non-traditional association of products. Additionally, features such as limiting the e-coupon valid for the first X redemption can be actively tracked by all e-coupon recipients, and even where they were redeemed. In some embodiments, the interactive promotional e-coupons may even include a score board showing the e-coupon recipient the popularity of the product advertised and thereby drive additional sales. Thus consumer may perceive the eRFI coupon application and the interactive e-coupons as "fun" and "exciting" and drive the advertisers and promoters to advertise on the new medium. In various embodiments, a control and/or tracking mechanism can be added to the medium to assure the advertisers that they are reaching their intended audience. This may involve a cell phone or other eRFI device reporting back to a server, e.g., eRFI fulfillment server 138 or tracking server 142, advertisement viewing activity or other eRFI related activity such as playing a game including advertisements. The invention could be implemented in the form of a 3D game engine where the advertiser provides the 3D models, graphical assets, and rules of play and e-coupon redemption. In some embodiments the electronic promotion information sent to a user communications device includes an interactive routine which displays a product or store location.

With the advancement of technology and ever increasing features which are being included in the next generation 3 G and 4 G mobile handsets, adoption rate for these 3 G and 4 G mobile handsets is increasing at a phenomenal rate. However, they are still not considered a commodity, such as television and personal computers, that would drive advertiser/promoters to use the various eRFI enabled video promotion methods and apparatus for their promotions. Typically, many consumers still use 2 G handsets with limited, usually text based, capabilities that does not interest advertisers and promoters. One factor that may discourage customers from acquiring a 3 G/4 G mobile handsets is the cost of such devices, and sometimes even the cost involved for some services on the 3 G/4 G mobile handsets.

Some features of the invention are directed to methods which allow customers to acquire the 3 G and 4 G mobile handsets without having them to fully pay for the 3 G and 4 G mobile handsets and/or services used on the phones. In accordance with some features of the invention consumers may obtain a subsidized mobile handset device on certain conditions, e.g., that they must view a minimum number of unsolicited advertisements/promotions via mobile eRFI in the form of a video or an electronic coupon (e-coupon) in a given billing cycle for a contract period. Advertisement/eRFI enabled promotional video viewing activity is monitored on the handset either by the handset itself which reports the information to a tracking server, e.g., such as server 142, and/or at the eRFI fulfillment server 138 which supplies advertisements and/or other promotional material to the subscribed handset. It should be appreciated that advertisers/promoters also includes service providers in addition to product sellers, retailers etc. In some embodiments the consumers who agree/fulfill the conditions set forth by the advertisers/promoters who are funding the subsidized mobile handsets, pay a fraction of the price that otherwise they would have to pay normally. In some other embodiments the customers initially pay for the mobile handsets but are refunded the paid amount, e.g., over a period of time, based on the number of eRFI enabled promotional videos that they view in a given billing cycle as indicated by the tracking information which is collected.

In some embodiments the customers are also rewarded by way of being given "earned" air-time, which in some embodiments is calculated based on number of ad views, or advertiser/promoter eRFI fulfillment quota, and/or Multi System Operator (MSO) promotion. With "earned" air-time, the consumer may use the handset built-in applications, such as email, calendar, phone, etc. In some embodiments, a "digital wallet" application is placed in the advertiser/promoter funded 3 G/4 G mobile handsets to track the consumer's spending habits and provide automatic accounting functions, such as budgeting, personal finance, account balance, etc. In some implementations, such a subsidized mobile handset could also be manufactured with embedded RFID tags that can be read at retail locations point of sales for automatic debit from their credit card, bank account, and/or MSO billing with the information being reported back to the tracking server 142 for use in billing purposes. If the consumer does not spend enough time viewing the advertisement they will be charged on their credit/debit and/or monthly MSO billing statement, any usage above their earned allowance for the given billing cycle.

In some embodiments a mobile handset device has the mobile eRFI and eRFI coupon applications as part of the handsets operating system (OS) or running as a background application so unsolicited advertisements can be pulled or pushed to the handset periodically, automatically and cached, even if the handset is "powered-off". In various embodiments, the mobile handsets have location determination capabilities with the location being reported to the headend 102 and used for advertisement targeting purposes. Thus in at least some embodiments, location based advertisements, similar to that of a physical road side bill board, where a promoter, e.g.: local restaurant, grocery store, etc., can place a promotion that is valid within a radius of their or their competition's location at certain times to increase foot traffic are supported. The location based advisements may come, for example, in two forms, unsolicited eRFI enabled video with an eRFI action at the end, e.g., a prompt inviting the user to take further action if interested, and/or automatic eRFI fulfillment where a promotional item is automatically requested by the handset when triggered by the handsets location.

Another interesting application is for Real estate companies and/or agents who can very well use various features of the methods of the invention. In some embodiments real estate agents place an electronic promotion, e.g., an eRFI enabled video presenting 3D view of the house, pictures of various offered features etc., that is valid within a radius of a house during an open house. In a similar manner various other types of promoters can generate additional traffic to their events, e.g., by promoting less expensive tickets to consumers located nearby, close to the start of the event to fill otherwise vacant seats.

In various embodiments, to prevent fraudulent uses of the 3 G and 4 G mobile handsets, if a minimum number of advertisements are not viewed or fulfilled in consecutive billing period, or if the handsets becomes idle and was not returned within the contract period, the wireless service can be remotely shut off and/or the consumer's credit card charged for the full amount of the cost of the mobile handset device. In various embodiments, location tracking of the mobile handset device can be enabled for the consumer or local authorities to retrieve the device in the event of the mobile handset being lost or stolen.

Among other things, an advantage of various features of the invention where mobile handset subsidies are supported is that it reduces the cost of owning a 3 G/4 G handset to the consumer to facilitate an increase in the adoption of such mobile handset devices while providing a vehicle for advertisers and promoters to gain more insights to their customer behavior during their product promotion.

In the above described methods, in some embodiments, each step may be performed by one or more different software instructions executed by a computer processor, e.g., a central processing unit (CPU). At least one system implemented in accordance with the present invention includes a means for implementing each of the various steps which are part of the methods of the present invention. Each means may be, e.g., an instruction, processor, hardware circuit and/or combination of elements used to implement a described step.

Many of the above described methods or method steps can be implemented using machine, e.g., computer, executable instructions, such as software, included in a non-transitory machine, e.g., computer, readable medium used to control a machine, e.g., general purpose computer with or without additional hardware, to implement all or portions of the above described methods, e.g., in one or more nodes. The machine readable medium may be, e.g., a memory device, e.g., RAM, floppy disk, etc. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow.

What is claimed is:

1. A method of communicating electronic promotion information, the method comprising:
   operating a first communications device to receive electronic promotion information signed by a sender device sending the electronic promotion information to the first communications device, said first communications device being a device used by an intended user of said electronic promotion information;
   operating the first communications device to perform one of:
   i) send a signed version of the electronic promotion information including a signature corresponding to the first communications device and a signature corresponding to said sender device to at least one other device; or
   ii) send a message to cause a signed version of the electronic promotion information including a signature corresponding to the first communications device and a signature corresponding to the sender device to be sent to the at least one other device; and
   wherein said signature corresponding to the first communications device is generated by one of said first communications device or a server using a key or secret corresponding to the first communications device.

2. The method of claim 1,
   wherein the method includes said step of operating the first communications device to send a message to cause a signed version of the electronic promotion information including the signature corresponding to the first communications device and the signature corresponding to the sender device to be sent to at least one other device, and
   wherein said step of operating the first communications device to send a message to cause a signed version of the electronic promotion information including the signature corresponding to the first communications device and the signature corresponding to the sender device to be sent to at least one other device includes:
   operating the first communications device to send a request to forward the electronic promotion information.

3. The method of claim 2, further comprising:
   operating a server that was used to communicate the electronic promotion information that was received by the first communications device to forward the electronic promotion information with a signature corresponding to the first communications device and a signature corresponding to the sender device to said at least one other device.

4. The method of claim 1, wherein said received electronic promotion information includes information identifying multiple mobile wireless communications devices which are in a forwarding chain involved in forwarding said electronic promotion information to said first communications device, said forwarding chain including mobile wireless communications devices which forwarded said electronic promotion information or caused said electronic promotion information to be forwarded.

5. The method of claim 1,
   wherein said first communications device is a wireless communications terminal and where said at least one other device is a second wireless terminal; and
   wherein said method includes said step of operating the first communications device to send the signed version of the electronic promotion information including the signature corresponding to the first communications device and the signature corresponding to said sender device to said at least one other device, the method further comprising:
   operating the first communications device to sign said electronic promotion information to generate said signed version of the electronic promotion information including the signature corresponding to the first communications device and the signature corresponding to said sender device.

6. The method of claim 1, wherein said electronic promotion information is one of a eRFI enabled video or an electronic coupon.

7. The method of claim 1,
   wherein said electronic promotion information includes an electronic coupon, the method further comprising:
   operating the first communications device to receive updated coupon value information, said updated coupon value information indicating a current value of said electronic coupon, said current value being a function of a number of electronic coupons forwarded by said first communications device which were redeemed.

8. The method of claim 7, wherein said updated coupon value information is received from a server used to track coupon redemption.

9. The method of claim 8, wherein said received electronic promotion information includes forwarding information and digital signatures corresponding to a plurality of senders in a forwarding chain through which said electronic promotion information was forwarded to the first communications device.

10. The method of claim 7, further comprising:
operating the first communications device to redeem the electronic coupon by supplying coupon information to a retailer.

11. The method of claim 1, wherein said step of operating a first communications device to receive electronic promotion information includes:
receiving an electronic coupon from a mail server which forwarded the electronic coupon to an E-mail address corresponding to a user of said first communications device in response to a request received via a cable set top box.

12. The method of claim 1, wherein the method includes said step of
operating the first communications device to send a signed version of the electronic promotion information including a signature corresponding to the first communications device and a signature corresponding to said sender device to at least one other device; and
wherein sending the signed version of the electronic promotion information to at least one other device includes:
accessing a list of addresses corresponding to a social network; and
forwarding the electronic promotion information to at least one address included in the list of addresses corresponding to the social network.

13. The method of claim 12, wherein said electronic promotion information is an electronic coupon; and
wherein the at least one address to which said electronic promotion information is forwarded is selected by a user of said first communications device after said electronic promotion information is displayed on a display.

14. The method of claim 1, wherein said electronic promotion information includes an interactive routine which displays a product or store location.

15. The method of claim 14, wherein said interactive routine is a cell phone application, said cell phone application allowing a user to view and manipulate a 3D representation of a product available for purchase.

16. The method of claim 14, wherein said interactive routine is a game routine which can be played on a user's cell phone in which items for sale are displayed as part of said game.

17. The method of claim 16, wherein said interactive routine includes an option for purchasing one or more items via the cell phone.

18. The method of claim 1, wherein said first communications device is a set top box.

19. The method of claim 1, wherein said first communications device is a wireless terminal.

20. A system for supporting electronic promotions, the system comprising:
a first server including a processor, the first server being configured to:
send electronic promotion information to a first communications device, said electronic promotion information being signed by a sender of the electronic promotion information, said first communications device used by an intended user of said electronic promotion information;
a second server configured to:
monitor, after said electronic promotion information is sent to the first communications device, for a request to forward the electronic promotion information to a second communications device; and
wherein said first server is further configured to:
forward a signed version of said electronic promotion information including information identifying said first communications device to said second communications device, said second communications device being indicated by said request to forward the electronic promotion information, said signed version of said electronic promotion information including a signature corresponding to said sender of the electronic promotion information and a signature of the first communications device; and
wherein said signature of the first communications device is generated by one of said first communications device or said second server using a key or secret corresponding to the first communications device.

21. The system of claim 20, further comprising:
a third server configured to:
track redemption of one or more electronic coupons included in electronic promotion information that is forwarded by said first communications device with an electronic signature of the first communications device or is sent to another device with an electronic signature corresponding to said first communications device; and
adjust a value of an electronic coupon sent to the first communications device based on the redemption of a forwarded coupon including a signature of the first communications device.

22. The system of claim 21,
wherein said second server is further configured to send information to the first communications device indicating the adjusted value of said electronic coupon sent to the first communications device.

23. The method of claim 22, wherein said first server is an E-mail server.

24. The method of claim 23, wherein said first communications device is a set top box.

* * * * *